(No Model.)

F. D. JONES.
MECHANICAL MOTOR.

No. 313,598. Patented Mar. 10, 1885.

WITNESSES
C. Fred. Heller.
John W. Ridenour.

INVENTOR
Franklin D. Jones.
By J. B. Lawyer
Attorney

United States Patent Office.

FRANKLIN D. JONES, OF BURLINGTON, KANSAS, ASSIGNOR OF ONE-FOURTH TO HAMILTON M. HART, OF PERRY, IOWA.

MECHANICAL MOTOR.

SPECIFICATION forming part of Letters Patent No. 313,598, dated March 10, 1885.

Application filed December 11, 1884. (No model.)

*To all whom it may concern:*

Be it known that I, FRANKLIN D. JONES, a citizen of the United States, residing at Burlington, in the county of Coffey and State of Kansas, have invented certain new and useful Improvements in Mechanical Motors; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has for its object to provide an improved and simplified mechanical motor for operating a pump, grindstone, or other like purposes; and it consists, essentially, of a frame-work provided with a series of cog-gears, which are driven by means of a weight, cord, and drum, said cog-gears operating a novel mechanism for imparting motion to a horizontal crank-shaft, as hereinafter will be fully described, and designated in the claims.

Figure 1:
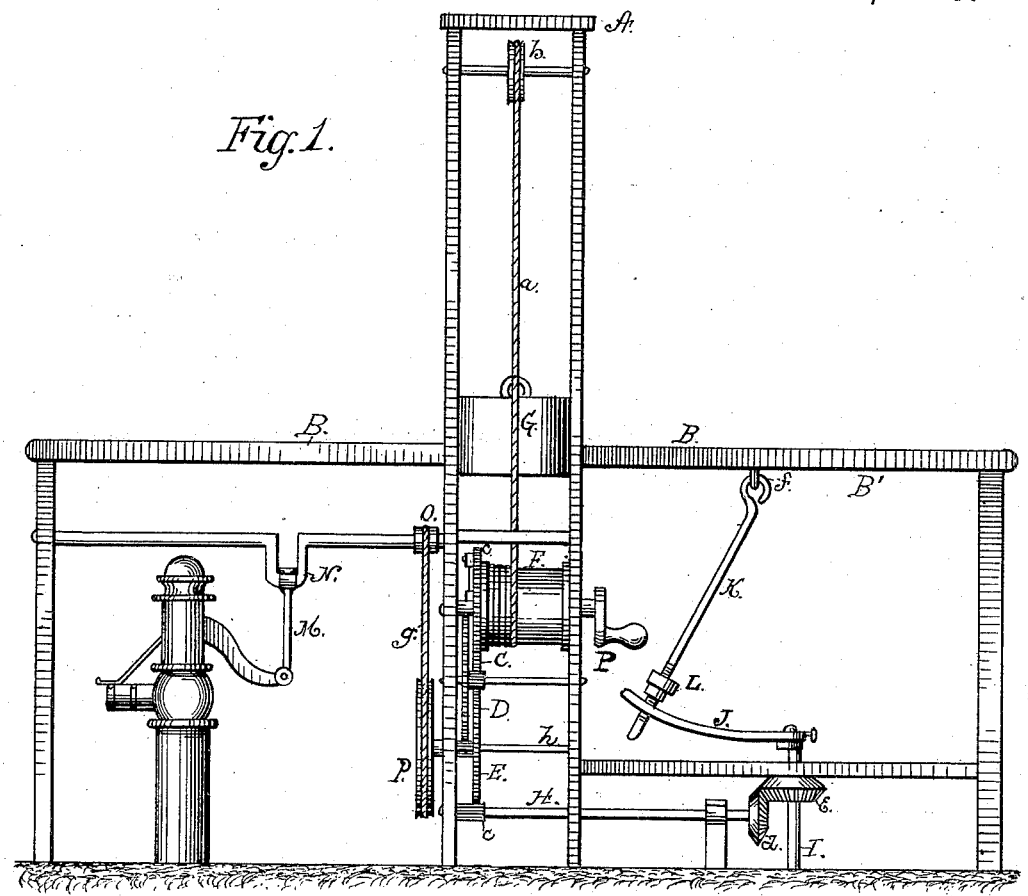
Figure 2:
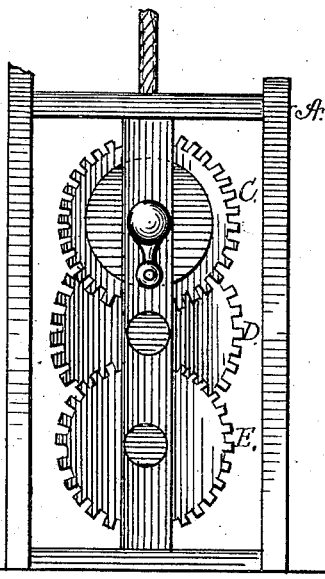

In the accompanying drawings, Figure 1 represents a front elevation of my complete invention, and Fig. 2 a side view thereof.

Similar letters of reference occurring on the several figures indicate like parts.

In carrying out my invention, I provide a wooden or metallic frame of suitable height and dimensions. The center portion is constructed to receive the frame A, which contains the mechanism for imparting motion to the horizontal shaft. To the lower part of the frame A are journaled two or more cog-gears, C D E, which mesh with each other, as shown, the upper gear-wheel, C, being rigidly attached to the one end of a drum, F, and provided with a suitable pawl and ratchet.

To the drum F is attached one end of a cord or chain, *a*, the opposite end of which passes upward over a pulley, *b*, journaled in the upper part of the frame A, and extending downward is secured to the weight G, as fully shown in Fig. 1.

The shaft to which the drum F and cog-gear C are attached is made square at its outer end, so as to receive a crank or ratchet-wheel with a lever of any required length for winding up the cord and weight when it is desired to set the apparatus in motion. The lower cog-gear, E, meshes into a smaller cog-wheel, *c*, which is arranged upon a horizontal shaft, H, journaled in the lower part of the frame A, and extending to the rear portion of the said frame, where it is provided with bevel gear-wheel *d*, which engages with corresponding gear-wheel E, arranged upon a vertically-journaled shaft, I, as fully shown in Fig. 1. To the top of said shaft I is secured one end of a curve-arm, J, the opposite end of which is slotted to receive the lower end of a pendulum, K, which is provided with a ball, L, above the surface of the said arm J, as shown. The upper end of the pendulum K is hooked to a ring, *f*, attached to the under surface of the cross-beam B', in a true vertical line with the shaft I. The vertical rod or pitman M, which imparts motion to the pump or other kindred device, is attached to the crank-bar N, as shown. The crank-bar N has a grooved pulley, O, rigidly secured to it to receive the belt or chain *g*, which passes over the said pulley O and also over the band-wheel P. The said band-wheel P is secured to shaft *h*, and operates by the gear-wheel D with great advantage of power over similar constructed machines.

Having thus described my invention, what I claim, and desire to secure by Letters Patent, is—

1. The frame A B, provided with gear-wheels C D E, drum F, weight G, cord *a*, band-wheel P, pulley O, crank-shaft N, shafts H I, provided with bevel-gear *d e*, arm J, and pendulum K, having weight or ball L, substantially as shown and described.

2. The herein-described mechanical motor, consisting of the frame A, provided with the weight G, pulley *b*, cord *a*, and drum F, gear-wheels C, D, and E, band-wheel P, pulley O, and belt *g*, in combination with the frame B, provided with crank-shaft N, pitman M, shafts H I, having bevel-gearing *d* and *e*, pendulum K, and arm J, all arranged as and for the purpose set forth.

In testimony whereof I affix my signature in presence of two witnesses.

FRANKLIN D. JONES.

Witnesses:
A. B. HUTCHISON,
AUSTIN HOPPER.